United States Patent
Quinn et al.

(10) Patent No.: US 12,043,726 B2
(45) Date of Patent: Jul. 23, 2024

(54) METHOD FOR COATING METAL ROOF WITH ETHYLENE VINYL ACETATE COMPOSITION

(71) Applicant: WACKER CHEMIE AG, Munich (DE)

(72) Inventors: Carol Quinn, Schwenksville, PA (US); Christian Daniels, Fogelsville, PA (US)

(73) Assignee: WACKER CHEMIE AG, Munich (DE)

( * ) Notice: Subject to any disclaimer, the term of this patent is extended or adjusted under 35 U.S.C. 154(b) by 743 days.

(21) Appl. No.: 15/734,737

(22) PCT Filed: Jun. 5, 2018

(86) PCT No.: PCT/US2018/036056
§ 371 (c)(1),
(2) Date: Dec. 3, 2020

(87) PCT Pub. No.: WO2019/236067
PCT Pub. Date: Dec. 12, 2019

(65) Prior Publication Data
US 2021/0189168 A1    Jun. 24, 2021

(51) Int. Cl.
| C08L 101/00 | (2006.01) |
| C08K 3/26 | (2006.01) |
| C08K 3/34 | (2006.01) |
| C09D 131/04 | (2006.01) |

(52) U.S. Cl.
CPC .......... *C08L 101/00* (2013.01); *C09D 131/04* (2013.01); *C08K 3/26* (2013.01); *C08K 2003/265* (2013.01); *C08K 3/346* (2013.01)

(58) Field of Classification Search
CPC ....... C08L 101/00; C09D 131/04; C08K 3/26; C08K 3/346; C08K 2003/265; C08F 218/08; C08F 210/02; C08F 220/06; C08F 230/085; B05D 2202/00
IPC .............. C08F 218/08,210/02, 220/06, 230/085
See application file for complete search history.

(56) References Cited

U.S. PATENT DOCUMENTS

| 4,859,723 A | 8/1989 | Kyminas et al. |
| 9,249,060 B2 | 2/2016 | Herold et al. |
| 9,334,388 B2 | 5/2016 | Killat |
| 2002/0103283 A1 | 8/2002 | Elfring et al. |
| 2009/0069495 A1* | 3/2009 | Fichtner .............. C09D 133/12 524/588 |
| 2017/0029544 A1* | 2/2017 | Mueller .................... C08F 2/22 |

FOREIGN PATENT DOCUMENTS

| CN | 103555091 A | * | 2/2014 |
| EP | 2202251 B1 | | 12/2011 |
| EP | 1916275 B1 | | 5/2012 |
| WO | 15130729 A1 | | 9/2015 |

OTHER PUBLICATIONS

"WACKER—Creating tomorrow's solutions, VAE dispersions for a variety of coatings", PPCJ Reprint Mar. 1, 2016, XP055529946.
Fox T.G., Bulletin of American Physics Society, 1, 3, p. 123 (1956).
Polymer Handbook, 2nd Edition, J. Wiley & Sons, New York (1975).
Encyclopedia of Polymer Science and Engineering, vol. 8 (1987), John Wiley & Sons, pp. 659 to 677.

* cited by examiner

*Primary Examiner* — William P Fletcher, III
(74) *Attorney, Agent, or Firm* — BROOKS KUSHMAN P.C.

(57) ABSTRACT

Aqueous roof coating compositions contain an aqueous dispersion of a vinyl acetate ethylene copolymer obtained by polymerizing by aqueous emulsion polymerization, in the presence of one or more emulsifiers, of
  a) 50 to 90% by weight of vinyl acetate,
  b) 2 to 45% by weight of ethylene, and
  c) 0.1 to 10% by weight of at least one functional comonomer which is an ethylenically unsaturated acid or salt thereof, an ethylenically unsaturated carboxamide, or an ethylenically unsaturated silane monomers, and optionally
  d) 0 to 35% by weight of copolymerizable ethylenically unsaturated non-functional comonomers, based on the total weight of the monomers and fillers and optionally pigments.

8 Claims, No Drawings

METHOD FOR COATING METAL ROOF WITH ETHYLENE VINYL ACETATE COMPOSITION

CROSS REFERENCE TO RELATED APPLICATIONS

This application is the U.S. National Phase of PCT Appln. No. PCT/US2018/036056 filed Jun. 5, 2018, the disclosure of which is incorporated in its entirety by reference herein.

BACKGROUND OF THE INVENTION

1. Field of the Invention

The invention relates to roof coating compositions comprising a vinyl acetate ethylene copolymer (VAE copolymer), a method for the coating of a metal roof with the roof coating compositions, and metal roofs coated with the roof coating composition.

2. Description of the Related Art

Metal roofs are often coated with roof coatings, which are applied as an aqueous composition. Such roof coatings protect the roofs from effects of weathering like corrosion. In many cases, these roof coatings are white in color; to reflect a high fraction of solar radiation, and thereby reduce building energy costs in hot regions by maintaining a cool roof. Roof coatings for metal roofs (eg. roofs made of aluminum or steel or galvanized steel) are often based upon acrylic polymers or urethane polymers, which are applied as an aqueous composition to the surface of the metal roofs.

WO 2015/130729 A1 discloses gradient polymer compositions for roof coatings with a broad measured glass transition temperature (Tg) of the gradient emulsion polymer. The gradient emulsion polymer is composed of "soft" acrylate monomers and "hard" methacrylate units. US 2002/0103283 A1 discloses a high reflectance coating composition for roofs. The coating composition comprises a binder polymer composed of acrylate monomer units and/or methacrylate monomer units and/or styrene monomer units. U.S. Pat. No. 9,249,060 B2 discloses cementitious roof coatings comprising mineral binder and a polymer binder on the basis of protective colloid stabilized aqueous polymer dispersions.

SUMMARY OF THE INVENTION

The object of the invention was to provide roof coating compositions with high adhesion to the surface of a metal roof and with a copolymer binder on a monomer basis different from expensive acrylate polymers or methacrylate polymers.

Surprisingly, this object has been achieved with a coating composition, free of mineral binders, and comprising a surfactant-stabilized vinyl acetate ethylene copolymer.

DETAILED DESCRIPTION OF THE PREFERRED EMBODIMENTS

In one aspect, the invention provides an aqueous roof coating composition comprising an aqueous dispersion of a vinyl acetate ethylene copolymer obtainable by means of a radically initiated, aqueous emulsion polymerization, in the presence of one or more emulsifiers, of
a) 50 to 90% by weight of vinyl acetate,
b) 2 to 45% by weight of ethylene,
c) 0.1 to 10% by weight of at least one functional comonomer out of the group comprising ethylenically unsaturated acids and their salts, ethylenically unsaturated carboxamides, and ethylenically unsaturated silane monomers, and optionally
d) 0 to 35% by weight of copolymerizable ethylenically unsaturated non-functional comonomers, based in each case on the total weight of the monomers used for the polymerization, and the data in % by weight summing in each case to 100% by weight.

In general, the vinyl acetate is copolymerized in the copolymer in an amount of 70 to 95% by weight, more preferably the vinyl acetate content is in the range of 80 to 95% by weight, in each case based on the total weight of monomers.

In general, ethylene is copolymerized in the copolymer in an amount of preferably 5 to 40% by weight, more preferably 15 to 30% by weight, in each case based on the total weight of monomers.

Preferably, the functional monomers are copolymerized in an amount from 0.1 to 5% by weight, most preferably 0.2 to 2% by weight in each case based on the total weight of monomers.

Examples of functional monomers are ethylenically unsaturated monocarboxylic and dicarboxylic acids, typically acrylic acid, methacrylic acid, fumaric acid and maleic acid; ethylenically unsaturated carboxamides, typically acrylamide; monoesters of fumaric acid and maleic acid, such as the ethyl and isopropyl esters, and also maleic anhydride, ethylenically unsaturated sulphonic acids and their salts, typically vinylsulphonic acid, 2-acrylamido-2-methyl-propanesulphonic acid. Preferred functional monomers are acrylic acid, methacrylic acid and vinylsulphonic acid or 2-acrylamido-2-methylpropanesulphonic acid or salts of these sulphonic acid compounds.

Also suitable as functional monomers are ethylenically unsaturated, hydrolyzable silane monomers, for example γ-acryloyl- and γ-methacryloyloxypropyltri(alkoxy)silanes, vinylalkyldialkoxysilanes, and vinyltrialkoxysilanes, having $C_1$ to $C_{12}$ alkoxy groups and optionally $C_1$ to $C_3$ alkyl radicals. Ethylenically unsaturated, hydrolyzable silane monomers that are most preferred are vinyltrimethoxysilane, vinyltriethoxysilane, 3-methacryloyloxypropyltrimethoxysilane, 3-methacryloyloxypropyltriethoxysilane.

In some embodiments, the copolymer may include 0 to 35% by weight, preferably 0 to 10% by weight, in each case based on the total weight of monomers, of other non-functional monomer units from the group consisting of vinyl chloride, vinyl esters and (meth)acrylic acid esters. Suitable other vinyl esters are those of carboxylic acids with 3 to 12 carbon atoms such as vinyl propionate, vinyl butyrate, vinyl 2-ethylhexanoate, vinyl laurate, 1-methyl vinyl acetate, vinyl pivalate and vinyl esters of alpha-branched monocarboxylic acids with 9 to 11 carbon atoms, such as VeoVa™9R, VeoVa™10R, or VeoVa™11R (available from Hexion Specialty Chemicals, Inc., Columbus, Ohio). Suitable methacrylic or acrylic acid esters are esters of straight-chain or branched alcohols having 1 to 15 C atoms, for example methyl acrylate, methyl methacrylate, ethyl acrylate, ethyl methacrylate, propyl acrylate, propyl methacrylate, butyl acrylate (n-, iso- and tert-), n-butyl methacrylate, 2-ethylhexyl acrylate and norbornyl acrylate. Methyl acrylate, methyl methacrylate, butyl acrylate and 2-ethylhexyl acrylate are preferred. Such non-functional monomer may be introduced for the adjustment of the glass transition temperature or of hydrophobic characteristic.

Most preferred copolymers are those of ethylene and vinyl acetate without further non-functional monomers.

The monomers are preferably selected so as to provide the copolymers with a glass transition temperature (Tg) of −20° C. to 10° C., and more preferably −20° C. to 0° C. The glass transition temperature (Tg) of the copolymers can be determined in a known way by means of differential scanning calorimetry (DSC) with a heating rate of 10 K per minute according to ASTM D3418-82 as midpoint temperature. The Tg may also be calculated approximately in advance by means of the Fox equation. According to Fox T. G., Bull. Am. Physics Soc. 1, 3, page 123 (1956), it holds that: $1/Tg=x1/Tg1+x2/Tg2+ \ldots +xn/Tgn$, where xn is the mass fraction (% by weight/100) of the monomer n and Tgn is the glass transition temperature, in kelvins, of the homopolymer of the monomer n. Tg values for homopolymers are listed in Polymer Handbook, 2nd Edition, J. Wiley & Sons, New York (1975).

Emulsifiers are used to stabilize the aqueous dispersion of the vinyl acetate ethylene copolymers.

Suitable emulsifiers are nonionic emulsifiers or anionic emulsifiers or mixtures of nonionic and anionic emulsifiers. The amount of emulsifier is preferably 0.5 to 10% by weight, more preferred 1.5 to 5% by weight, in each case based on the total amount of monomers used for the polymerization.

Suitable nonionic polymeric emulsifiers have polyoxyalkylene units with at least three (3) alkylene oxide units, wherein the alkylene oxide units are ethylene oxide and/or propylene oxide units. Preferred are copolymers of ethylene oxide and propylene oxide with a minimum content of at least 10% by weight of ethylene oxide.

Suitable anionic emulsifiers are the sodium, potassium, and ammonium salts of alkyl sulfates and of alkylsulfonates having in each case 10 to 20 C atoms, and also of alkylarylsulfonates having 12 to 20 C atoms, and of sulfosuccinic esters with aliphaic saturated monohydric alcohols having 4 to 16 C atoms. Preferably, no protective colloids such as polyvinyl alcohols are used in addition to the emulsifiers.

The vinyl acetate ethylene copolymer dispersions are produced via an aqueous, radically initiated emulsion polymerization using conventional emulsion polymerization procedure. Such a procedure has been described many times and is known to a skilled person in the art. For example, such procedures are described in the Encyclopedia of Polymer Science and Engineering, Vol. 8 (1987), John Wiley & Sons, pages 659 to 677 or for example in EP 1916275 A1. In general, the polymerization takes place in pressure reactors at a temperature of 50° C. to 120° C. under a pressure of 10 to 90 bar abs.

The polymerization is in general initiated using the redox initiator combinations that are customary for emulsion polymerization. Examples of suitable oxidation initiators are the sodium, potassium, and ammonium salts of peroxodisulfuric acid, hydrogen peroxide, t-butyl hydroperoxide, cumene hydroperoxide. Preference is given to the sodium, potassium, and ammonium salts of peroxodisulfuric acid and to hydrogen peroxide. The stated initiators are used in general in an amount of 0.01% to 2.0% by weight, based on the total weight of the monomers.

The stated oxidizing agents, more particularly salts of peroxodisulfuric acid, may also be used on their own as thermal initiators.

Suitable reducing agents are the sulfites and bisulfites of the alkali metals and of ammonium, as for example sodium sulfite, the derivatives of sulfoxylic acid such as zinc sulfoxylates or alkali metal formaldehyde sulfoxylates, as for example sodium hydroxymethanesulfinate (Brüggolit), and ascorbic acid or isoascorbic acid. It is preferred to use isoascorbic acid. The amount of reducing agent is preferably 0.01% to 3.0% by weight, based on the total weight of the monomers.

All of the monomers may form an initial charge, or all of the monomers may form a feed, or portions of the monomers may form an initial charge and the remainder may form a feed after the polymerization has been initiated. The feeds may be separate (spatially and chronologically), or all or some of the components may be fed after pre-emulsification. All of the emulsifier may form an initial charge, or all of the emulsifier may form a feed, or portions of the emulsifier may form an initial charge and the remainder may form a feed after the polymerization has been initiated. The feeds may be separate (spatially and chronologically), or all or some of the components may be fed after pre-emulsification.

The solids content of aqueous copolymer dispersion is typically in a range from 45% to 75% by weight.

A typical roof coating composition comprises 35 to 55% by weight of the vinyl acetate ethylene copolymer binder solids, 25 to 40% by weight of filler, optionally 1 to 15% by weight of pigment, and optionally other additives for example thickener, wetting agents, dispersants, biocide, all % by weight are based on the total solids of the composition.

In a preferred embodiment, no mineral binders, such as cement, are part of the roof coating composition.

Suitable fillers are for example calcium carbonate, clay, mica, talc, alumina silicates, alumina hydrate or mixtures of any of these fillers. Suitable pigments may be for example titanium dioxide, iron oxide or organic pigments. Suitable thickeners are for example urethane thickeners or cellulosic thickeners such as methyl cellulose. Propylene glycol is widely used in such roof coating compositions as a wetting agent. Preferably, no propylene glycol is used in the inventive roof coating formulation. Dispersants for the stabilization of pigments and fillers are present, for example polyacids and their salts such as polymethacrylic acid and its sodium salt.

The preparation of the roof coating composition with the vinyl acetate ethylene copolymer binder disclosed herein may be according to the formulation principles generally known in the art. For example, an aqueous slurry of filler and pigments is mixed with the aqueous VAE dispersion and the other ingredients in a standard industrial mixer. Water is added for obtaining a roof coating composition with a solids content of preferably 45 to 55% by weight. The roof coating composition preferably has a pigment volume concentration (PVC) of 30 to 45%.

The coating composition may be applied by spray, roller or brush, generally in an amount of about 1 to about 2 gallons/100 sq. ft., and dried to form a protective coating without cracking. The thickness of the coating composition is generally in the range of about 0.025 to 0.050 inches. The thickness of the dried coating is in the range of 0.015 to 0.025 inches.

The examples below serve for further explanation of the invention.

The following inventive roof coating formulations were used to prepare the compositions to test:

| Ingredients | % by weight |
|---|---|
| Formula 1: No Propylene Glycol | |
| Polymer (52% solids) | 44.0 |
| Pigment (TiO$_2$, Ti-Pure R-706, Chemours Company) | 8.1 |

-continued

| Ingredients | % by weight |
| --- | --- |
| Filler (CaCO₃, Atomite) | 24.2 |
| Filler (Talc, Talcron MP 12-50, Speciality Minerals) | 8.9 |
| Dispersant (Tamol 165, Dow Chemical) | 1.1 |
| Rheology Modifier (Acrysol RM825, Dow Chemical) | 0.3 |
| Ammonium Hydroxide | 0.3 |
| Surfactant (Surfynol AD01, Evonik Industries) | 0.2 |
| Foam Control Agent (Drewplus TS-4481, Ashland) | 0.5 |
| Water | 12.3 |
| Formula 2: Contains Propylene Glycol | |
| Polymer (52% solids) | 44.0 |
| Pigment (TiO₂, Ti-Pure R-706, Chemours Company) | 8.1 |
| Filler (CaCO₃, Atomite) | 24.2 |
| Filler (Talc, Talcron MP 12-50, Speciality Minerals) | 8.9 |
| Dispersant (Tamol 165, Dow Chemical) | 1.1 |
| Rheology Modifier (Acrysol RM825, Dow Chemical) | 0.3 |
| Ammonium Hydroxide | 0.3 |
| Surfactant (Surfynol AD01, Evonik Industries) | 0.2 |
| Foam Control Agent (Drewplus TS-4481, Ashland) | 0.5 |
| Water | 10.9 |
| Propylene Glycol | 1.5 |

Example 1

Aqueous dispersion of a vinyl acetate ethylene copolymer composed of 72.75% b.w. vinyl acetate, 25.5% b.w. ethylene, 1.5% b.w. acrylic acid, 0.25% b.w. vinyl triethoxysilane stabilized with a surfactant mixture of 0.37% b.w. Aerosol MA (sodium dihexyl sulfosuccinate), 1.5% Pluronic L-64 (nonionic ethylenoxide propylene oxid block copolymer), 1.0% b.w. Rhodacal DS-10 (sodium dodecyl benzyl sulfonate), based in each case on the total weight of the monomers. Solids content of 55% b.w. and Tg=−13° C.

Comparison Example 2

Rhoplex EC-1791 of Dow, an all-acrylic polymer latex with solids content of about 55% b.w. and Tg=−40° C.

Test method was based on ASTM C794 for measuring dry adhesion and wet adhesion on aluminum panels or galvanized steel panels:

The tests were performed with an Instron measuring instrument model 4464.

Preparation of Test Samples:

Galvanized panels were cleaned with Simple Green® available from Sunshine Makers, Inc. to remove storage oil. After rinsing with water, the galvanized panels were dried at 120° F. in an oven for one hour. Clean aluminum panels were purchased directly from Q-panel.

The first layer of coating was applied with a putty knife and two 0.025" shims on each the edge of the panel were used to control film thickness. Two pieces of roofing fabric, one inch wide by twelve inch long, were then placed side by side on top of the wet first layer. Additional 0.025" shims were stacked on top of the original shims for a total gap of 0.05". More coating was applied using the putty knife.

These substrates were allowed to dry for two weeks at a constant humidity of 50% and a temperature of 72° F. (+/−2 degrees). Dry adhesion was tested by pulling the free end of the roof fabric, angled at 180 degrees, away from the bottom of the substrate at a rate of 2"/min on the Instron. One inch of fabric was pulled per test. The force required to pull the fabric was reported as the average force per test. The results are reported in pounds per linear inch (PLI) in Table 1. Three pulls were made per strip of fabric. Only one of the two strips on each panel was measured dry. After all panels had been measured for dry adhesion they were then soaked for one week in water and the wet sample is then run by the same procedure as the dry sample. The Samples were run in duplicate.

The results are summarized in Table 1.

Measuring unit of results in Table 1—pounds per linear inch (PLI)

Test Results:

TABLE 1

| Substrate | Example 1 with PG | Example 1 no PG | Comp. Ex. 2 with PG | Comp. Ex. 2 no PG |
| --- | --- | --- | --- | --- |
| Dry Al | 4.4 | 8.0 | 2.2 | 1.4 |
| Wet Al | 0.8 | 1.7 | 0.7 | 1.2 |
| Dry Steel | 4.2 | 4.6 | 3.6 | 2.0 |
| Wet Steel | 1.7 | 2.0 | 1.5 | 1.5 |

The invention claimed is:

1. A method for coating a metal roof with an aqueous roof coating composition, comprising:
   coating the metal roof with an aqueous coating composition consisting of: i) 35 to 55% by weight of an aqueous dispersion of a vinyl acetate/ethylene copolymer and one or more emulsifiers, wherein the vinyl acetate/ethylene copolymer consists of:
   a) 50 to 90% by weight of vinyl acetate units,
   b) 2 to 45% by weight of ethylene units,
   c) 0.1 to 10% by weight of at least one functional comonomer unit selected from the group consisting of ethylenically unsaturated monocarboxylic and dicarboxylic acids, monoesters of maleic acid, fumaric acid, and salts thereof, maleic anhydride, ethylenically unsaturated carboxamides, and ethylenically unsaturated silane monomers,
   wherein the weight percentages are based on the total weight of monomer units a) to c), and total 100% by weight, and the vinyl acetate/ethylene copolymer is prepared by polymerizing monomers which result in units a)-c) by a single stage aqueous polymerization;
   ii) 25 to 40% by weight of one or more fillers;
   iii) optionally 1 to 15% by weight of one or more pigments; and
   iv) optionally one or more thickeners, wetting agents, dispersants, and/or biocides, wherein the percents by weight for components i) to iv) are based on the total solids of the composition, and wherein the roof coating composition contains no mineral binders.

2. The method of claim 1, wherein no propylene glycol is contained in the roof coating composition.

3. The method of claim 1, wherein the aqueous roof coating composition is applied in an amount of 0.4075-0.815l/m² and dried to form a protective coating.

4. A metal roof coated by the method of claim 1.

5. The method of claim 1, wherein vinyl acetate units (a) are present in an amount of 70-90 wt. %.

6. The method of claim 1, wherein vinyl acetate units (a) are present in an amount of 80-90 wt. %.

7. The method of claim 1, wherein ethylene units (b) are present in an amount of from 5-40% by weight.

8. The method of claim 1, wherein ethylene units (b) are present in an amount of from 15-30% by weight.

* * * * *